(12) United States Patent
Li

(10) Patent No.: US 11,086,412 B2
(45) Date of Patent: Aug. 10, 2021

(54) METHOD FOR DETERMINING DISPLAY ORIENTATION AND ELECTRONIC APPARATUS USING THE SAME AND COMPUTER READABLE RECORDING MEDIUM

(71) Applicant: HTC Corporation, Taoyuan (TW)

(72) Inventor: Kuan-Wei Li, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 16/515,670

(22) Filed: Jul. 18, 2019

(65) Prior Publication Data

US 2020/0257378 A1  Aug. 13, 2020

Related U.S. Application Data

(63) Continuation of application No. 15/439,560, filed on Feb. 22, 2017, now Pat. No. 10,409,395.

(30) Foreign Application Priority Data

Aug. 8, 2016  (CN) .......................... 201610641344.X

(51) Int. Cl.
*G09G 1/00* (2006.01)
*G06F 3/0346* (2013.01)
(Continued)

(52) U.S. Cl.
CPC ............ *G06F 3/0346* (2013.01); *G06F 3/011* (2013.01); *G06F 3/03547* (2013.01);
(Continued)

(58) Field of Classification Search
CPC .......... G06F 3/041; G06F 3/0488; G06F 3/16; H03K 17/95; G09G 1/00; G06K 9/00
See application file for complete search history.

(56) References Cited

U.S. PATENT DOCUMENTS 8,754,745 B2   6/2014 Wang et al.
2009/0184935 A1*  7/2009 Kim ....................... G06F 3/0488
345/173

(Continued)

FOREIGN PATENT DOCUMENTS

CN   103049118 A   4/2013
CN   103140822 A   6/2013
(Continued)

OTHER PUBLICATIONS

Taiwanese Office Action and Search Report for Taiwanese Application No. 105125159, dated Aug. 28, 2017.
(Continued)

*Primary Examiner* — Michael A Faragalla
(74) *Attorney, Agent, or Firm* — Birch, Stewart, Kolasch & Birch, LLP

(57) ABSTRACT

A method for determining display orientation is provided. The method includes the following steps. Sense a plurality of touch points by at least one hold sensor, and determine a holding gesture of the electronic apparatus according to the plurality of touch points. The at least one hold sensor is disposed on at least one side of the electronic apparatus. Determine a holding direction of the electronic apparatus according to the holding gesture. Determine a display orientation of a frame generated by the electronic apparatus according to the holding direction.

15 Claims, 14 Drawing Sheets

(51) Int. Cl.
    *G06F 3/01*         (2006.01)
    *G06F 3/0354*     (2013.01)
    *G06F 3/041*      (2006.01)
    *G06F 3/16*       (2006.01)
    *G06K 9/00*       (2006.01)
    *G06F 3/0488*     (2013.01)

(52) U.S. Cl.
    CPC .............. *G06F 3/041* (2013.01); *G06F 3/167* (2013.01); *G06K 9/00006* (2013.01); *G06F 3/0488* (2013.01); *G06F 2200/1614* (2013.01); *G06F 2203/04106* (2013.01); *G06F 2203/04108* (2013.01)

(56) References Cited

U.S. PATENT DOCUMENTS

| | | |
|---|---|---|
| 2011/0109577 A1 | 5/2011 | Lee et al. |
| 2013/0215060 A1* | 8/2013 | Nakamura .......... G06F 3/04883 345/173 |
| 2015/0153861 A1 | 6/2015 | Yamazaki et al. |
| 2015/0347463 A1* | 12/2015 | Voss .................... G06F 16/5846 707/722 |
| 2016/0034738 A1 | 2/2016 | Luo |

FOREIGN PATENT DOCUMENTS

| | | |
|---|---|---|
| CN | 105468269 A | 4/2016 |
| CN | 105630153 A | 6/2016 |
| TW | 201113743 A | 4/2011 |
| TW | 201239729 A1 | 10/2012 |
| TW | 201531903 A | 8/2015 |
| TW | 201612724 A | 4/2016 |

OTHER PUBLICATIONS

Taiwanese Office Action and Search Report for Taiwanese Application No. 105125159, dated Mar. 14, 2017.
Chinese Office Action for Chinese Application No. 201610641344.X, dated Jul. 2, 2019.

* cited by examiner

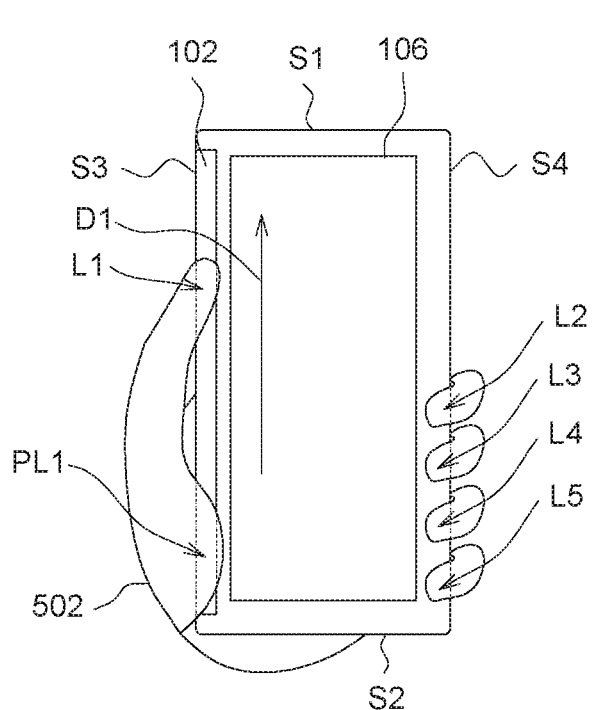 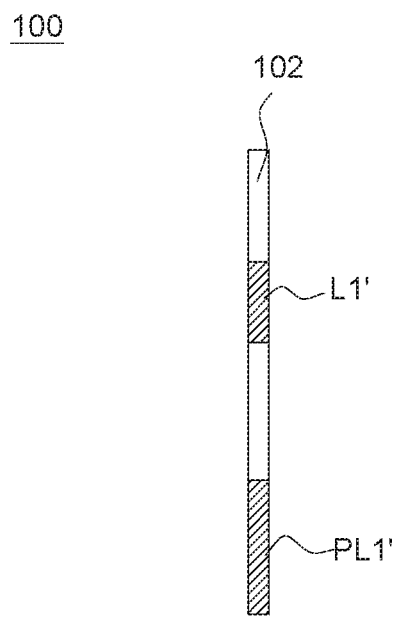
FIG. 6A  FIG. 6B
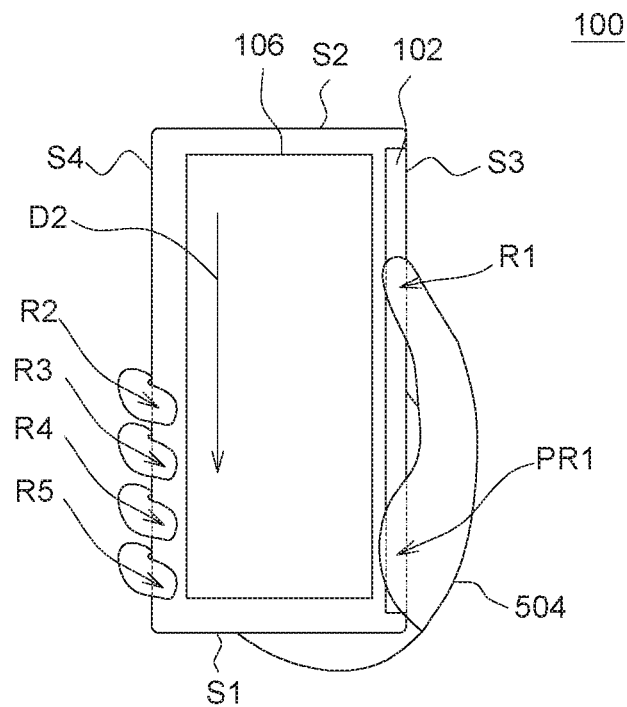 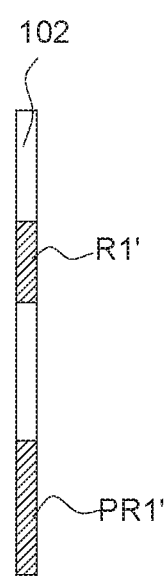
FIG. 7A  FIG. 7B

METHOD FOR DETERMINING DISPLAY ORIENTATION AND ELECTRONIC APPARATUS USING THE SAME AND COMPUTER READABLE RECORDING MEDIUM

This is a continuation application of U.S. application Ser. No. 15/439,560, filed on Feb. 22, 2017, which claims the benefit of People's Republic of China application Serial No. 201610641344.X, filed on Aug. 8, 2016, the disclosure of which is incorporated by reference herein in its entirety.

TECHNICAL FIELD

The disclosure relates in general to a method for determining orientation and an electronic apparatus, and more particularly to a method for determining display orientation and an electronic apparatus.

BACKGROUND

With the advent of the multimedia era, the applications of the display device will be expanded. Various electronic apparatus having a display device has been well known and widely used gradually. People often read the texts or view the pictures through electronic apparatus, and can also watch the videos through electronic apparatus. An electronic apparatus having a display device typically has two screen modes, the portrait mode and the landscape mode. Generally, the electronic apparatus determines the screen mode automatically through the sensing signal of the inertial sensor (for example, G-sensor). The function that the electronic apparatus automatically determines the screen mode is called auto orientation. However, if the screen of the electronic apparatus is parallel to the ground (e.g., the user uses the electronic apparatus when lying down), the G-sensor cannot determine the direction correctly, which causes the electronic apparatus to display the frame in wrong screen mode. For example, the user holds the electronic apparatus in landscape mode, but the electronic apparatus displays the frame in portrait mode; or the user holds the electronic apparatus in portrait mode, but the electronic apparatus displays the frame in landscape mode. Therefore, how to correctly determine the display orientation of the electronic apparatus has become an important topic in the industry.

SUMMARY

According to one embodiment, a method for determining display orientation is provided. The method includes the following steps. Sense a plurality of touch points by at least one hold sensor, and determine a holding gesture of the electronic apparatus according to the plurality of touch points. The at least one hold sensor is disposed on at least one side of the electronic apparatus. Determine a holding direction of the electronic apparatus according to the holding gesture. Determine a display orientation of a frame generated by the electronic apparatus according to the holding direction.

According to another embodiment, an electronic apparatus having a function of determining display orientation is provided. The electronic apparatus includes at least a hold sensor and a processor. The at least one hold sensor disposed on at least one side of the electronic apparatus, and the at least one hold sensor senses a plurality of touch points. The processor determines a holding gesture of the electronic apparatus according to the plurality of touch points, determines a holding direction of the electronic apparatus according to the holding gesture, and determines a display orientation of a frame generated by the electronic apparatus according to the holding direction.

The disclosure further provides a non-transitory computer readable recording medium for storing one or more programs, the one or more programs causing a processor to perform the aforementioned method after the one or more programs are loaded on an electronic apparatus and are executed.

The above and other aspects of the disclosure will become better understood with regard to the following detailed description of the non-limiting embodiment(s). The following description is made with reference to the accompanying drawings.

BRIEF DESCRIPTION OF THE DRAWINGS

FIG. 6A shows a schematic diagram when the left hand holds the electronic apparatus of FIG. 2.

FIG. 6B shows a schematic diagram of the finger position and palm position sensed by the hold sensor of FIG. 6A.

FIG. 7A shows a schematic diagram when the right hand holds the electronic apparatus of FIG. 2 in another holding direction.

FIG. 7B shows a schematic diagram of the finger position and palm position sensed by the hold sensor of FIG. 7A.

DETAILED DESCRIPTION

Figure 1:
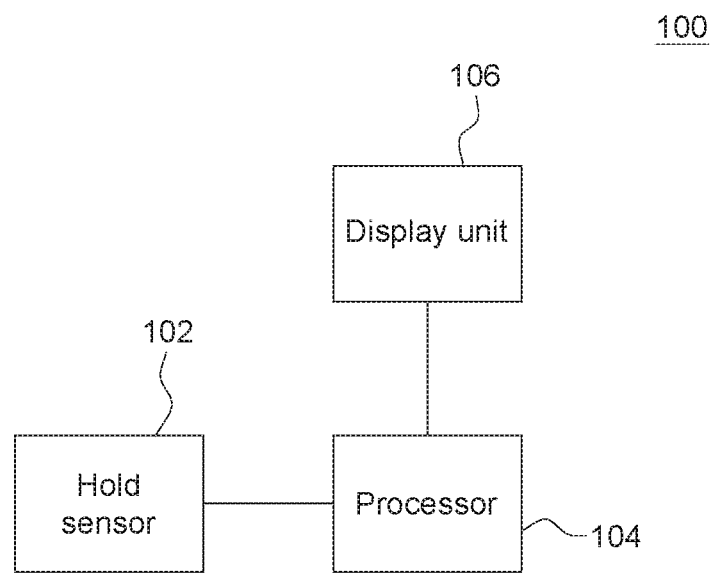
FIG. 1 shows a block diagram of an electronic apparatus having a function of determining display orientation according to an embodiment of the invention.
Figure 2:
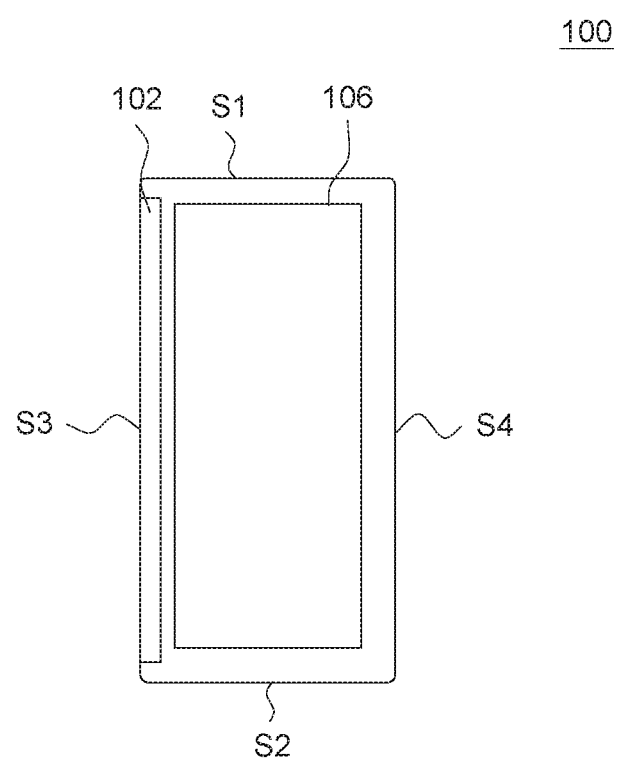
FIG. 2 shows a plan view of the electronic apparatus of FIG. 1 according to an embodiment of the invention.
Figure 3:
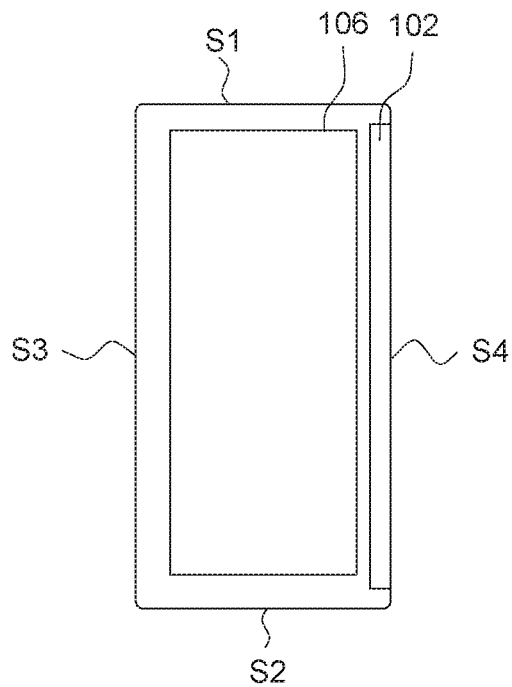
FIG. 3 shows a plan view of the electronic apparatus of FIG. 1 according to another embodiment of the invention.

Referring to FIG. 1, FIG. 2 and FIG. 3. FIG. 1 shows a block diagram of an electronic apparatus 100 having a function of determining display orientation according to an embodiment of the invention. FIG. 2 shows a plan view of the electronic apparatus 100 of FIG. 1 according to an embodiment of the invention. FIG. 3 shows a plan view of the electronic apparatus 100 of FIG. 1 according to another embodiment of the invention. The electronic apparatus 100 includes a hold sensor 102, processor 104 and a display unit 106. The hold sensor 102 and the display unit 106 are coupled to the processor 104. The hold sensor 102 is, but not limited to, a pressure sensor, a capacitive sensor, a resistive sensor or an ultrasonic sensor. The hold sensor 102 can be any sensor which can sense a touch position of the finger. The display unit 106 is, for example a liquid crystal display (LCD), for displaying a frame. The electronic apparatus 100 is, for example a tablet computer, or a smart phone. The first side S1 and the second side S2 are short sides of the electronic apparatus 100, and the third side S3 and fourth side S4 are long sides of the electronic apparatus 100. The hold sensor 102 is disposed on the third side S3 or the fourth side S4 of the electronic apparatus 100, for sensing a holding gesture on at least one long side of the electronic apparatus 100. The holding gesture includes finger position or palm position on the hold sensor 102. Based on the actual needs of the present invention, the hold sensor may be disposed on at least one short side of the electronic apparatus, it is not limited thereto.

Figure 4:
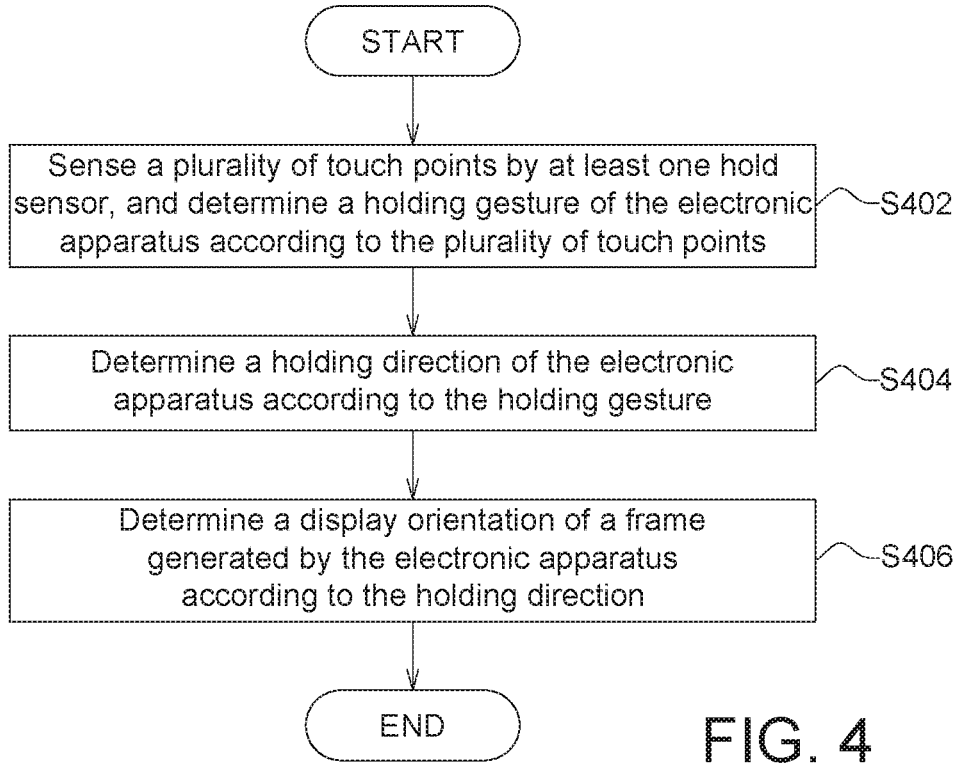
FIG. 4 shows a flow chart of a method for determining display orientation according to an embodiment of the invention.

Referring to FIG. 4, FIG. 4 shows a flow chart of a method for determining display orientation according to an embodiment of the invention. The method can be applied to electronic apparatus 100 of FIG. 2 or FIG. 3.

First, in step S402, the hold sensor 102 senses a plurality of touch points, and the processor 104 determines a holding gesture of the electronic apparatus 100 according to the plurality of touch points. The holding gesture includes a relative relationship between at least one finger position and the palm position on the hold sensor 102. Specifically, when the hold sensor 102 senses a dotted touch point, the processor 104 determines that the dotted touch point is a finger touch, and the position of the dotted touch point is the finger position. When the hold sensor 102 senses a sheeted touch point, the processor 104 determines that the sheeted touch point is a palm touch, and the position of the sheeted touch point is the palm position. For example, the processor 104 distinguishes the dotted touch point or the sheeted touch point according to area of the touch point, to determine whether the touch point is the finger touch or the palm touch. Or, the hold sensor 102 includes many sensor cells, and the processor 104 distinguishes the dotted touch point or the sheeted touch point according to the number of the sensor cells which are touched, to determine whether the touch point is the finger touch or the palm touch.

Figure 5:
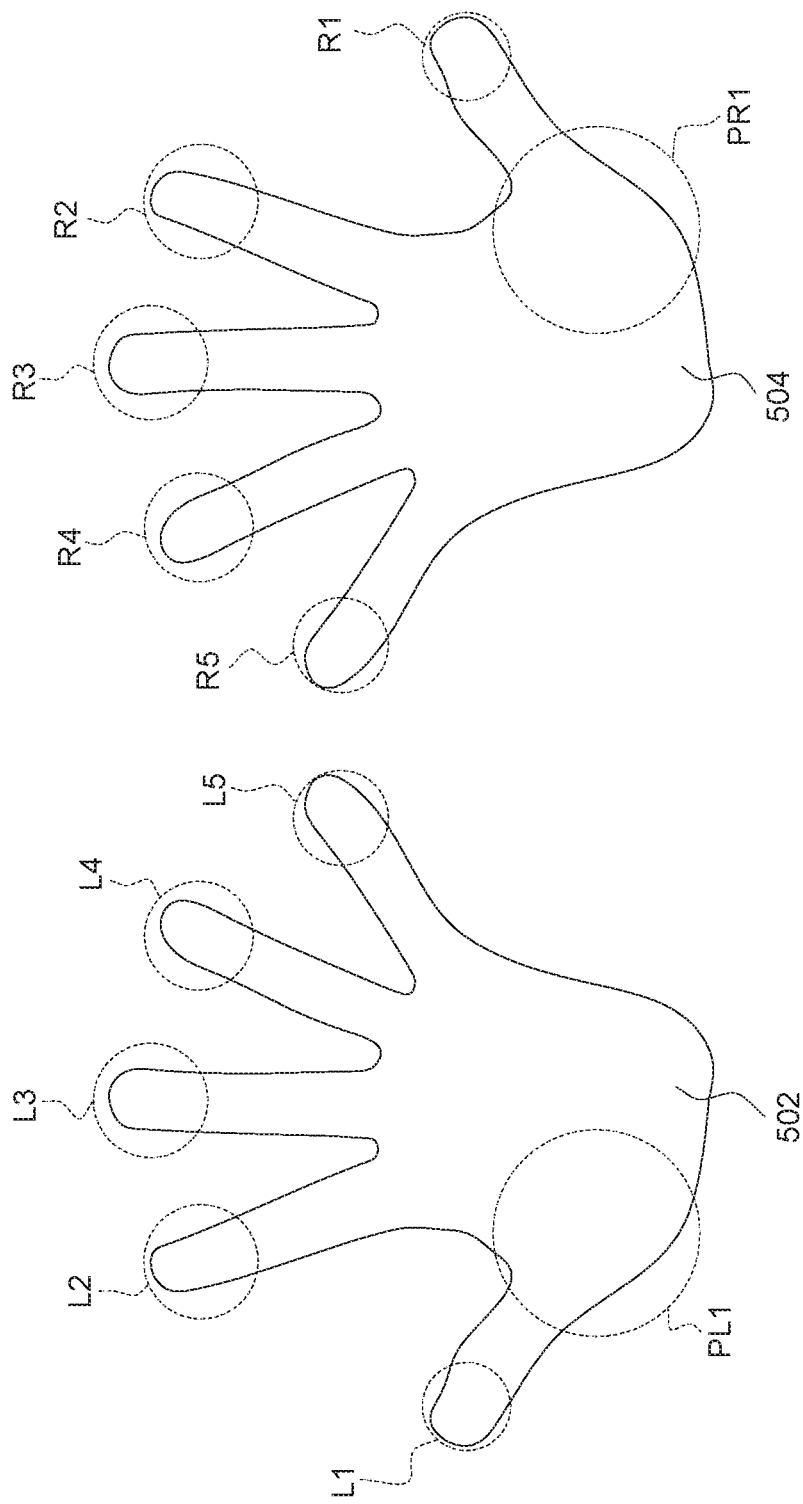
FIG. 5 shows a schematic diagram of a left hand and a right hand of the user.

Referring to FIG. 5 and FIG. 6. FIG. 5 shows a schematic diagram of a left hand 502 and a right hand 504 of the user. The left hand 502 includes thumb L1, index finger L2, middle finger L3, ring finger L4, little finger L5 and palm PL1. The right hand 504 includes thumb R1, index finger R2, middle finger R3, ring finger R4, little finger R5 and palm PR1. FIG. 6A shows a schematic diagram when the left hand 502 holds the electronic apparatus 100 of FIG. 2. FIG. 6B shows a schematic diagram of the finger position and palm position sensed by the hold sensor 102 of FIG. 6A. In FIG. 6A, the thumb L1 and the palm PL1 of the left hand 502 touch the third side S3, and the index finger L2, the middle finger L3, the ring finger L4 and the little finger L5 of the left hand 502 touch the fourth side S4. In FIG. 6B, the hold sensor 102 senses a dotted touch point L1 and a sheeted touch point PL1', and the processor 104 determines that the dotted touch point L1 is finger position, and the sheeted touch point PL1' is palm position.

Referring to FIG. 7. FIG. 7A shows a schematic diagram when the right hand 504 holds the electronic apparatus 100 of FIG. 2 in another holding direction. FIG. 7B shows a schematic diagram of the finger position and palm position sensed by the hold sensor 102 of FIG. 7A. In FIG. 7A, the right hand 504 holds the electronic apparatus 100 in another holding direction, and the thumb R1 and the palm PR1 of the right hand 504 touch the third side S3, and the index finger R2, the middle finger R3, the ring finger R4 and the little finger R5 of the right hand 504 touch the fourth side S4. In FIG. 7B, the hold sensor 102 senses a dotted touch point R1' and a sheeted touch point PR1', and the processor 104 determines that the dotted touch point R1' is finger position, and the sheeted touch point PR1' is palm position.

In step S404, the processor 104 determines the holding direction of the electronic apparatus 100 according to the holding gesture. In the invention, the holding direction may include a first holding direction and a second holding direction. The first holding direction is, for example the first side S1 is relative to the second side S2 which points upward. The second holding direction is, for example the first side S1 is relative to the second side S2 which points downward. More specifically, referring to FIG. 6A and FIG. 7A. FIG. 6A shows the first holding direction D1 of the electronic apparatus 100, and FIG. 7A shows the second holding direction D2 of the electronic apparatus 100.

Further, the processor 104 determines a thumb position according to relative relationship between the finger position and the palm position, and determines the holding direction of the electronic apparatus 100 according to the thumb position. The method of determining the thumb position according to relative relationship between the finger position and the palm position by the processor 104 is described as follows. Take FIG. 6A and FIG. 6B for example, when hold sensor 102 senses the dotted touch point and sheeted touch point, the processor 104 determines that at least one dotted touch point of the plurality of touch points corresponding to at least one finger position L1, and at least one sheeted touch point of the plurality of touch points corresponding to the at least one palm position PL1'. Because when the user holds the electronic apparatus 100, the thumb and the palm will touch the same side of the electronic apparatus 100. Therefore, the processor 104 can determine that the finger position L1 on the side which the palm position PL1' located (i.e. hold sensor 102) is the thumb position. Then, after the processor 104 obtains the thumb position, the processor 104 determines the holding direction of the electronic apparatus 100 according to the relative positions of the thumb position and the palm position on the hold sensor 102. It is described as follows. The hold sensor 102 has the predetermined coordinates, and the processor 104 can obtain the arrangement of the coordinates of the hold sensor 102 in advance. For example, the minimum value of the coordinates of the hold sensor 102 is arranged close to the second side S2, and the max value of the coordinates of the hold sensor 102 is arranged close to the first side S1. The processor 104 determines whether the thumb position L1 locates between the palm position PL1' and the max value of the coordinates or locates between the palm position PL1' and the minimum value of the coordinates according to the coordinate of the palm position PL1', the coordinate of the thumb position L1, the max value of the coordinates and the minimum value of the coordinates, to determine the holding direction of the electronic apparatus 100. In this example, the processor 104 determines that the thumb position L1 locates between the palm position PL1' and the max value of the coordinates, so the processor 104 determines that the holding direction of the electronic apparatus 100 is the first holding direction D1.

Similarly, take FIG. 7A and FIG. 7B for example, the processor 104 determines that the thumb position R1' locates between the palm position PR1 and the minimum value of the coordinates, so the processor 104 determines that the holding direction of the electronic apparatus 100 is the second holding direction D2.

In step S406, the processor 104 determines a display orientation of a frame generated by the electronic apparatus according to the holding direction. Referring to FIG. 6A and FIG. 6B, when the processor 104 determines that the holding direction of the electronic apparatus 100 is the first holding direction D1, the processor 104 displays the frame in right-side up display orientation (with respect to the first side S1) on the display unit 106. Referring to FIG. 7A and FIG. 7B, when the processor 104 determines that the holding direction of the electronic apparatus 100 is the second holding direction D2, the processor 104 displays the frame in upside down display orientation (with respect to the first side S1) on the display unit 106. Thus, even the electronic apparatus 100 is held upside down, the electronic apparatus 100 still can properly adjust the display orientation according to the holding direction.

Therefore, in this embodiment, when the hold sensor 102 senses the finger position and the palm position, the thumb position can be determined according to the finger position and the palm position sensed by the hold sensor 102. The holding direction of the electronic apparatus 100 is determined according to the thumb position, and the display orientation is determined based on the holding direction, to display the frame correctly.

Figure 7C:
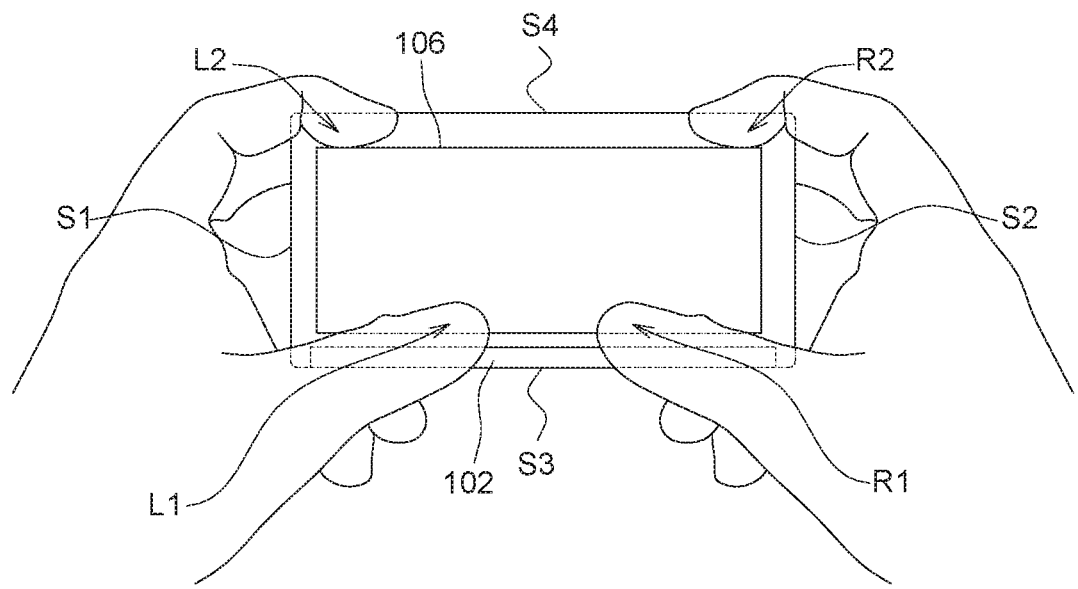
FIG. 7C shows a schematic diagram when the electronic apparatus is held in landscape mode in one example.
Figure 7D:
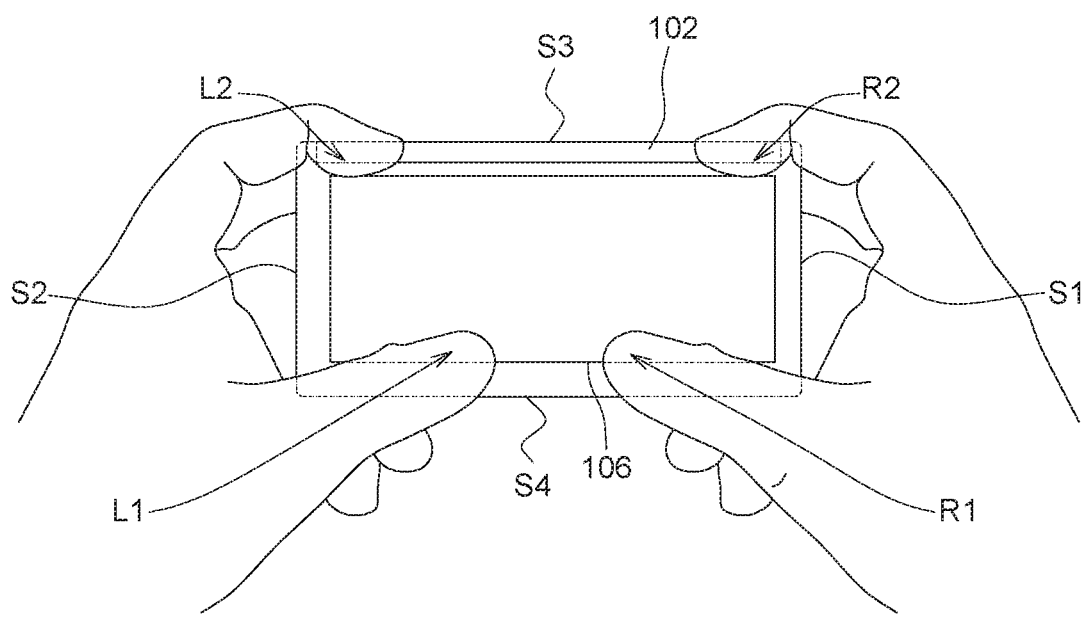
FIG. 7D shows a schematic diagram when the electronic apparatus is held in landscape mode in another example.

In one embodiment, the processor 104 can determine whether the electronic apparatus 100 is held in portrait mode according to sensing result of the hold sensor 102. When the electronic apparatus 100 is not held in portrait mode, the processor 104 keeps the auto orientation function of the electronic apparatus 100 enabled (i.e. the electronic apparatus 100 activates the function of auto orientation automatically according to the sensing result of the inertial sensor). For example, when the processor 104 determines that the electronic apparatus 100 is held in landscape mode, the processor 104 keeps the auto orientation function of the electronic apparatus 100 enabled. Referring to FIG. 7C and FIG. 7D, FIG. 7C shows a schematic diagram when the electronic apparatus 100 is held in landscape mode in one example, and FIG. 7D shows a schematic diagram when the electronic apparatus 100 is held in landscape mode in another example. In general, if the user wants to watch the frame of the electronic apparatus 100 in landscape mode, the user will hold the electronic apparatus 100 as shown in FIG. 7C and FIG. 7D. Therefore, when the hold sensor 102 senses only two dotted touch points, the processor 104 determines that the electronic apparatus 100 is held in landscape mode. On the other hand, when the processor 104 determines that the electronic apparatus 100 is held in portrait mode (as shown in FIG. 6A or FIG. 7A), the processor 104 deactivates the function of auto orientation. Thus, it can be avoided that the electronic apparatus 100 rotates the screen wrongly when the user lies down and uses the electronic apparatus 100.

In the following embodiments, the hold sensor, the processor and the display unit are the same as described in FIG. 1, and the first side S1 and the second side S2 are short sides of the electronic apparatus 100, and the third side S3 and the fourth side S4 are the long sides of the electronic apparatus 100.

Figure 8:
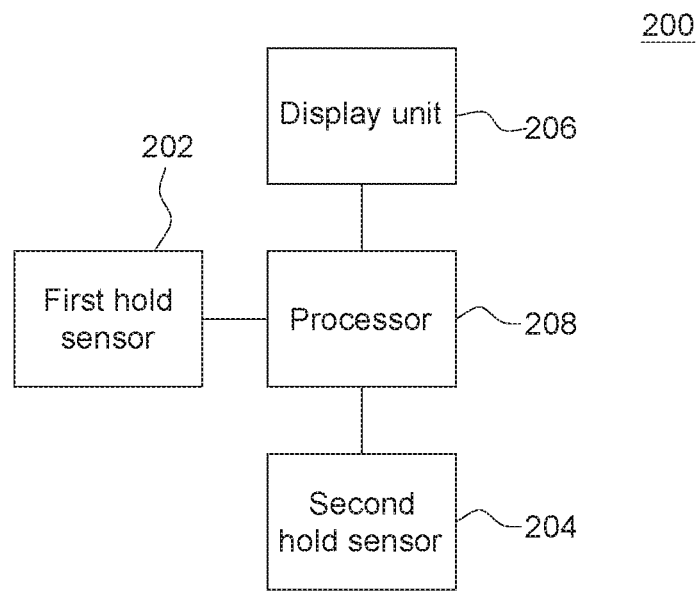
FIG. 8 shows a block diagram of the electronic apparatus having a function of determining display orientation according to one embodiment of the invention.
Figure 9:
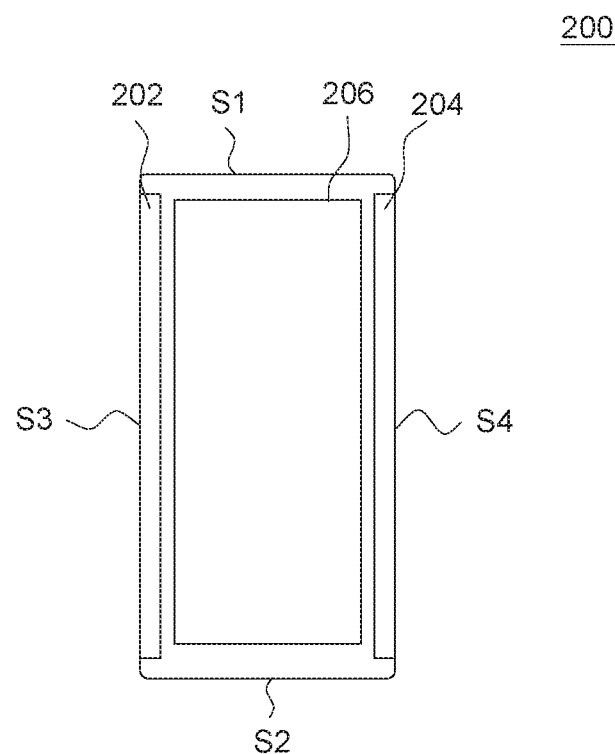
FIG. 9 shows a plan view of the electronic apparatus of FIG. 8.

Referring to FIG. 8 and FIG. 9. FIG. 8 shows a block diagram of the electronic apparatus 200 having a function of determining display orientation according to one embodiment of the invention. FIG. 9 shows a plan view of the electronic apparatus 200 of FIG. 8. The electronic apparatus 200 includes a first hold sensor 202, a second hold sensor 204, a display unit 206 and a processor 208. The first hold sensor 202, the second hold sensor 204 and the display unit 206 are coupled to the processor 208. The first hold sensor 202 and the second hold sensor 204 are disposed on the third side S3 and fourth side S4 of the electronic apparatus 100 respectively, for sensing the holding gesture on the long sides of the electronic apparatus 200. The holding gesture includes finger position or palm position on the first hold sensor 202 and the second hold sensor 204.

Figure 10:
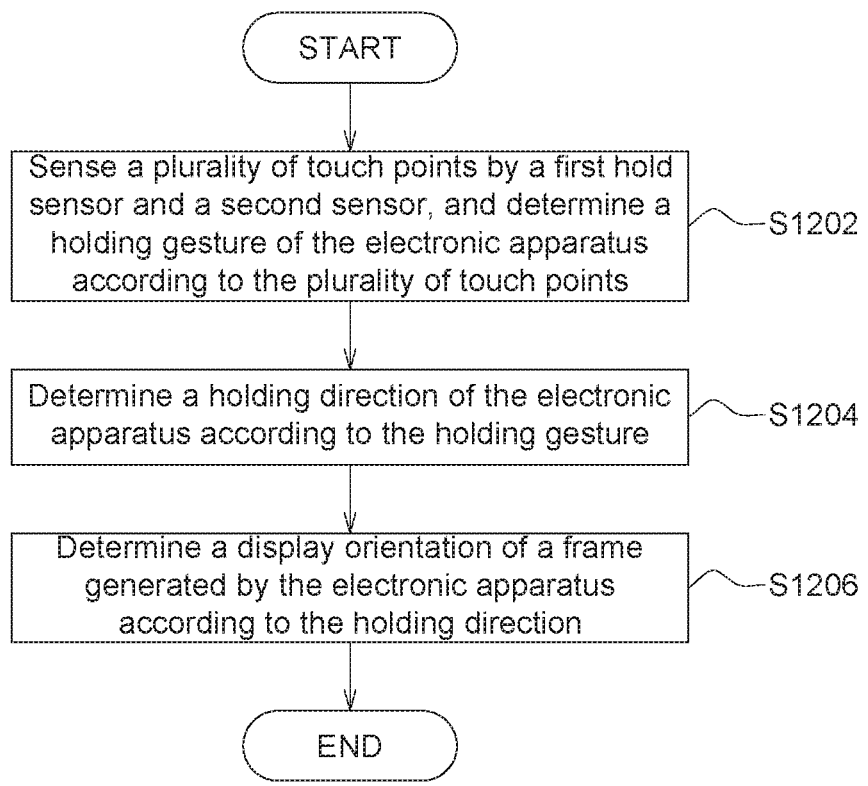
FIG. 10 shows a flow chart of a method for determining display orientation according to another embodiment of the invention.

Referring to FIG. 10, FIG. 10 shows a flow chart of a method for determining display orientation according to another embodiment of the invention.

First, in step S1202, the first hold sensor 202 and the second hold sensor 204 sense a plurality of touch points, and the processor 104 determines the holding gesture of the electronic apparatus 200 according to the plurality of touch points. The holding gesture includes a relative relationship between at least one finger position and the palm position on the first hold sensor 202 and the second hold sensor 204.

Figures 11A, 11B:
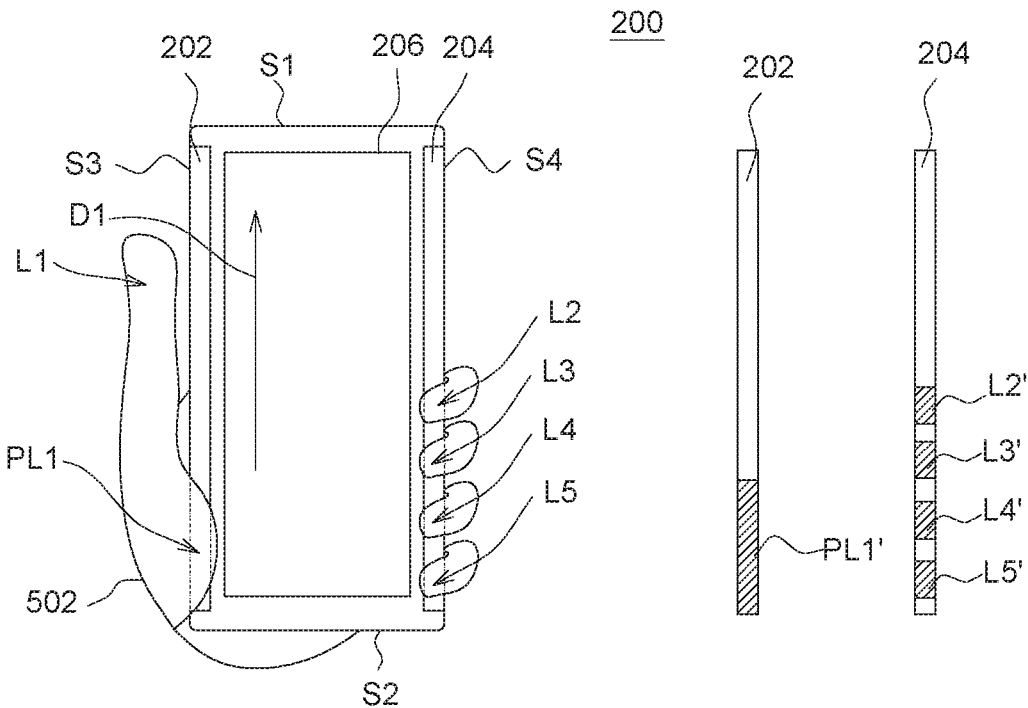
FIG. 11A shows a schematic diagram when the left hand holds the electronic apparatus of FIG. 9.
FIG. 11B shows a schematic diagram of the finger position and palm position sensed by the first hold sensor and the second hold sensor of FIG. 11A.
Figures 12A, 12B:
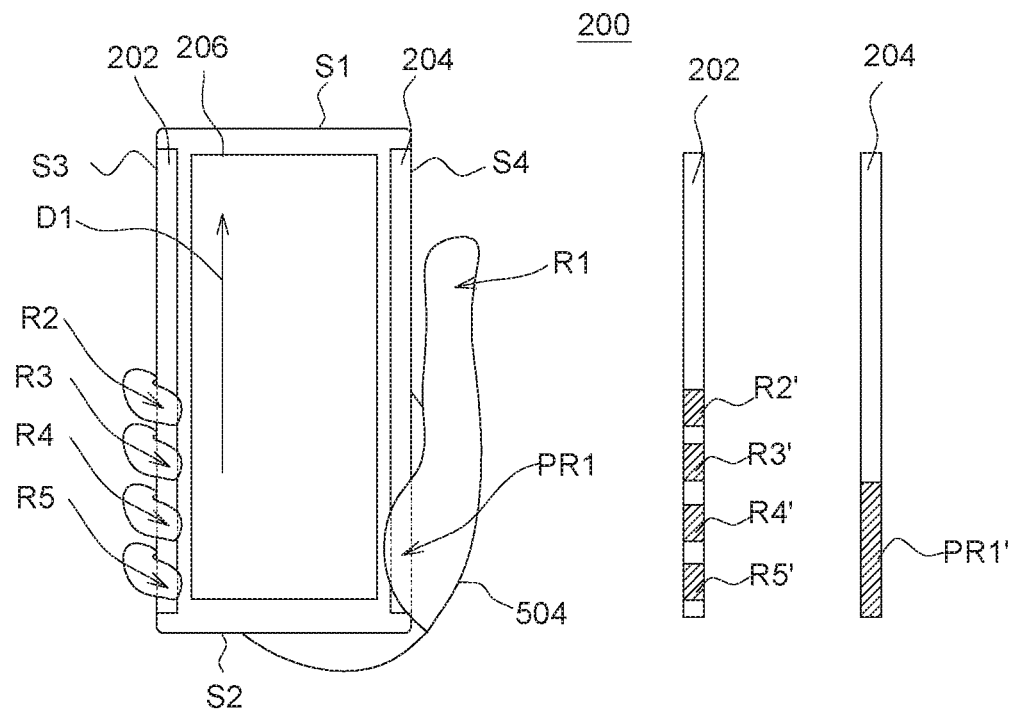
FIG. 12A shows a schematic diagram when the right hand holds the electronic apparatus of FIG. 9.
FIG. 12B shows a schematic diagram of the finger position and palm position sensed by the first hold sensor and the second hold sensor of FIG. 12A.

Referring to FIG. 11 and FIG. 12. FIG. 11A shows a schematic diagram when the left hand 502 holds the electronic apparatus 200 of FIG. 9. FIG. 11B shows a schematic diagram of the finger position and palm position sensed by the first hold sensor 202 and the second hold sensor 204 of FIG. 11A. FIG. 12A shows a schematic diagram when the right hand 504 holds the electronic apparatus 200 of FIG. 9. FIG. 12B shows a schematic diagram of the finger position and palm position sensed by the first hold sensor 202 and the second hold sensor 204 of FIG. 12A. In FIG. 11A, the palm PL1 of the left hand 502 touch the third side S3, and the index finger L2, the middle finger L3, the ring finger L4 and the little finger L5 of the left hand 502 touch the fourth side S4, and the thumb L1 of the left hand 502 does not touch any side of the electronic apparatus 200. In FIG. 11B, the first hold sensor 202 senses a palm position PL1', and the second hold sensor 204 senses four finger positions L2', L3', L4' and L5'. In FIG. 12A, the palm PR1 of the right hand 504 touch the fourth side S4, and the index finger R2, the middle finger R3, the ring finger R4 and the little finger R5 of the right hand 504 touch the third side S3, and the thumb R1 of the right hand 504 does not touch any side of the electronic apparatus 200. In FIG. 12B, the first hold sensor 202 senses four finger positions R2', R3', R4' and R5', and the second hold sensor 204 senses a palm position PR1'.

In step S1204, the processor 208 determines the holding direction of the electronic apparatus 200 according to the holding gesture. Specifically, the processor 208 determines the holding direction of the electronic apparatus 200 according to the center of gravity of the finger position and the center of gravity of the palm position. The center of gravity is, for example, the average of coordinates of the positions. The first hold sensor 202 and the second hold sensor 204 have the predetermined coordinates, and the processor 208 can obtain the arrangement of the coordinates of the first hold sensor 202 and the second hold sensor 204 in advance. For example, the minimum value of the coordinates of the first hold sensor 202 and the second hold sensor 204 is arranged close to the second side S2, and the max value of the coordinates of the first hold sensor 202 and the second hold sensor 204 is arranged close to the first side S1. Take FIG. 11A and FIG. 11B for example, the processor 208 calculates the center of gravity of four finger positions L2', L3', L4' and L5' and the center of gravity of palm position PL1'. That is, the processor 208 calculates the average of the coordinates of four finger positions L2', L3', L4' and L5' and the average of the coordinates of palm position PL1'. Then, the processor 208 determines whether the coordinate of the center of gravity of the finger positions L2', L3', L4' and L5' is closer to the minimum value of the coordinates or the max value of the coordinates than the coordinate of the center of gravity of the palm position PL1'. If the coordinate of the center of gravity of the finger positions L2', L3', L4' and L5' is closer to the max value of the coordinates than the coordinate of the center of gravity of the palm position PL1', the processor 208 determines that the holding direction of the electronic apparatus 200 is the first holding direction D1. If the coordinate of the center of gravity of the finger positions L2', L3', L4' and L5' is closer to the minimum value of the coordinates than the coordinate of the center of gravity of the palm position PL1', the processor 208 determines that the holding direction of the electronic apparatus 200 is the second holding direction D2. In FIG. 11, the coordinate of the center of gravity of the finger positions L2', L3', L4' and L5' is closer to the max value of the coordinates than the coordinate of the center of gravity of the palm position PL1', the processor 208 determines that the holding direction of the electronic apparatus 200 is the first holding direction D1. In FIG. 12, the coordinate of the center of gravity of the finger positions R2', R3', R4' and R5' is closer to the max value of the coordinates than the coordinate of the center of gravity of the palm position PR1', the processor 208 determines that the holding direction of the electronic apparatus 200 is the first holding direction D1. In this embodiment, we take four finger positions as an example, but not limited thereto. It is applicable that the first hold sensor 202 or the second hold sensor 204 senses at least one finger position, and the processor 208 calculates the center of gravity according to the at least one finger position and determines the relative relationship between the center of gravity of the finger position and the center of gravity of the palm position.

In another embodiment, the processor 208 determines the holding direction of the electronic apparatus 200 according to the relative relationship between the finger position and the palm position, not according to the center of gravity of the finger position and the center of gravity of the palm position.

The method of determining the holding direction of the electronic apparatus 200 according to the relative relationship between the finger position and the palm position by the processor 208 is described as follows. Take FIG. 11A and FIG. 11B for example, the processor 208 determines whether at least one coordinate interval which four finger positions L2', L3', L4' and L5' locate on is closer to the minimum value of the coordinates or the max value of the coordinates than the coordinate interval which palm position PL1' locates on, according to the coordinate intervals which four finger positions locate and the coordinate interval which palm positions locate. If the coordinate interval which at least one finger position locates on is closer to the max value of the coordinates than the coordinate interval which palm position PL1' locates on, the processor 208 determines that the holding direction of the electronic apparatus 200 is the first holding direction D1. If the coordinate interval which at least one finger position locates on is closer to the minimum value of the coordinates than the coordinate interval which palm position PL1' locates on, the processor 208 determines that the holding direction of the electronic apparatus 200 is the second holding direction D2. In FIG. 11, the coordinate intervals which the finger positions L2' and L3' locate on are closer to the max value of the coordinates than the coordinate interval which palm position PL1' locates on, so the processor 208 determines that the holding direction of the electronic apparatus 200 is the first holding direction D1. In FIG. 12, the coordinate intervals which the finger positions R2' and R3' locate on are closer to the max value of the coordinates than the coordinate interval which palm position PR1 locates on, so the processor 208 determines that the holding direction of the electronic apparatus 200 is the first holding direction D1. In this embodiment, we take four finger positions as an example, but not limited thereto. It is applicable that the first hold sensor 202 or the second hold sensor 204 senses at least one finger position, and the processor 208 determines the relative relationship between the finger position and the palm position according to the at least one finger position and the palm position.

In step S1206, the processor 208 determines the display orientation of a frame generated by the electronic apparatus 200 according to the holding direction. For example, referring to FIG. 11A and FIG. 11B, when the processor 208 determines that the holding direction of the electronic apparatus 200 is the first holding direction D1, the processor 208 displays the frame in right-side up display orientation (with respect to the first side S1) on the display unit 206. In other hand, when the processor 208 determines that the holding direction of the electronic apparatus 200 is the second holding direction D2, the processor 208 displays the frame in upside down display orientation (with respect to the first side S1) on the display unit 206.

Thus, even the user holds the electronic apparatus 200 and the thumb does not touch the electronic apparatus 200, the electronic apparatus 200 can estimate how the electronic apparatus 200 is held by the user according to the at least one finger position and the palm position sensed by the hold sensors disposed on the two sides of the electronic apparatus 200. The holding direction of the electronic apparatus 200 is determined according to the at least one finger position and the palm position, and display orientation is determined based on the holding direction, to display the frame correctly.

Figure 12C:
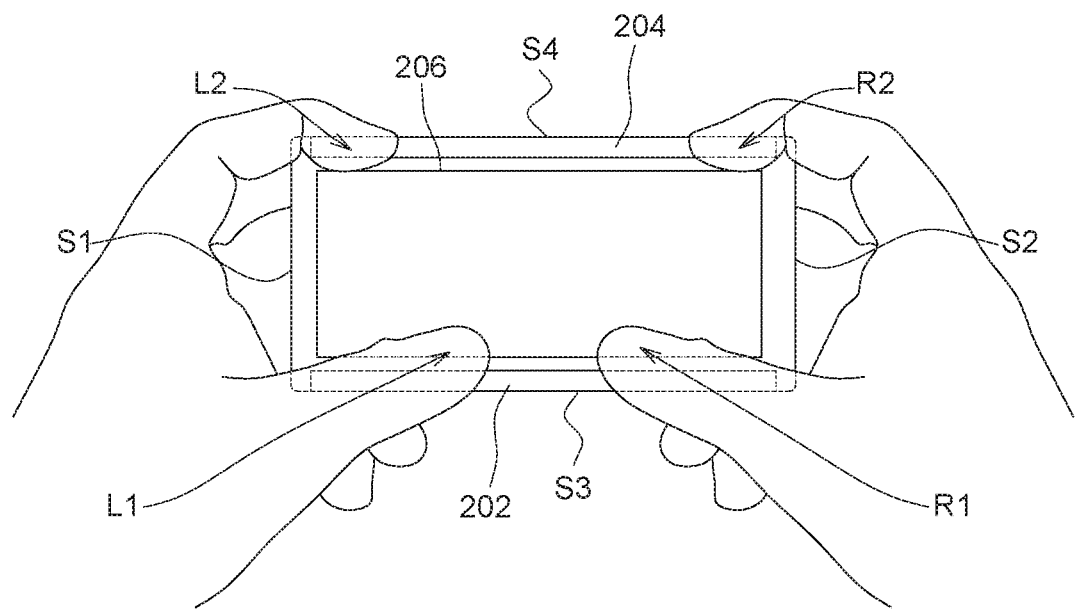
FIG. 12C shows a schematic diagram when the electronic apparatus is held in landscape mode in one example.
Figure 12D:
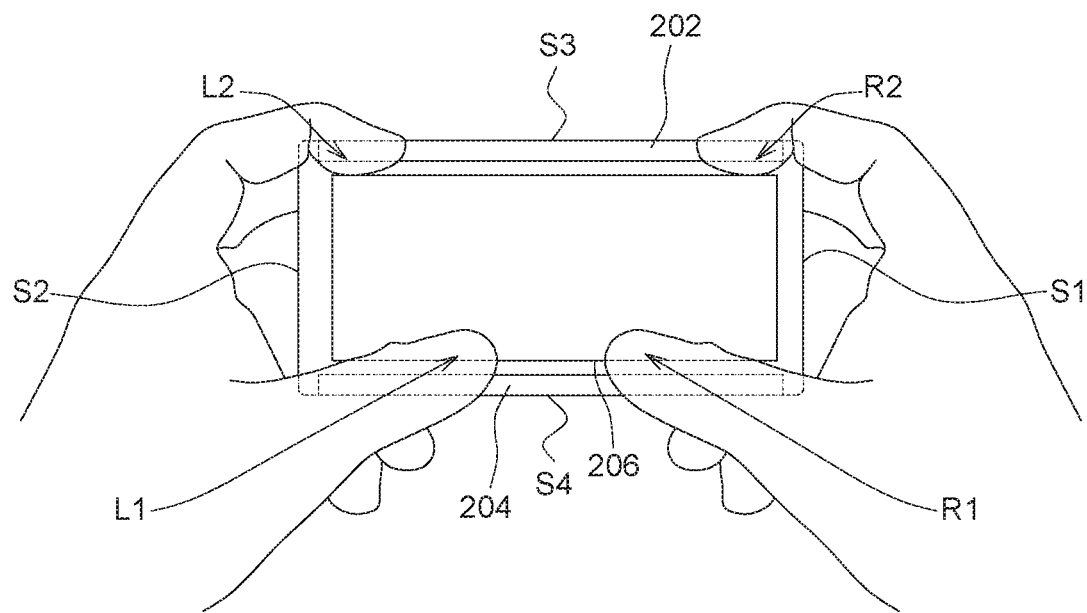
FIG. 12D shows a schematic diagram when the electronic apparatus is held in landscape mode in another example.

Similarly, the processor 208 can determine whether the electronic apparatus 200 is held in portrait mode according to sensing result of the hold sensors 202 and 204. When the electronic apparatus 200 is not held in portrait mode, the processor 208 keeps the auto orientation function of the electronic apparatus 200 enabled (i.e. the electronic apparatus 200 activates the function of auto orientation automatically according to the sensing result of the inertial sensor). For example, referring to FIG. 12C and FIG. 12D, FIG. 12C shows a schematic diagram when the electronic apparatus 200 is held in landscape mode in one example. FIG. 12D shows a schematic diagram when the electronic apparatus 200 is held in landscape mode in another example. In one embodiment, if the user holds the electronic apparatus 200 as shown in FIG. 12C and FIG. 12D, the hold sensor 202 and the hold sensor 204 sense four dotted touch points, and the processor 208 can determine that the electronic apparatus 200 is held in landscape mode, so the processor 208 keeps on the auto orientation function.

Figures 13A, 13B:
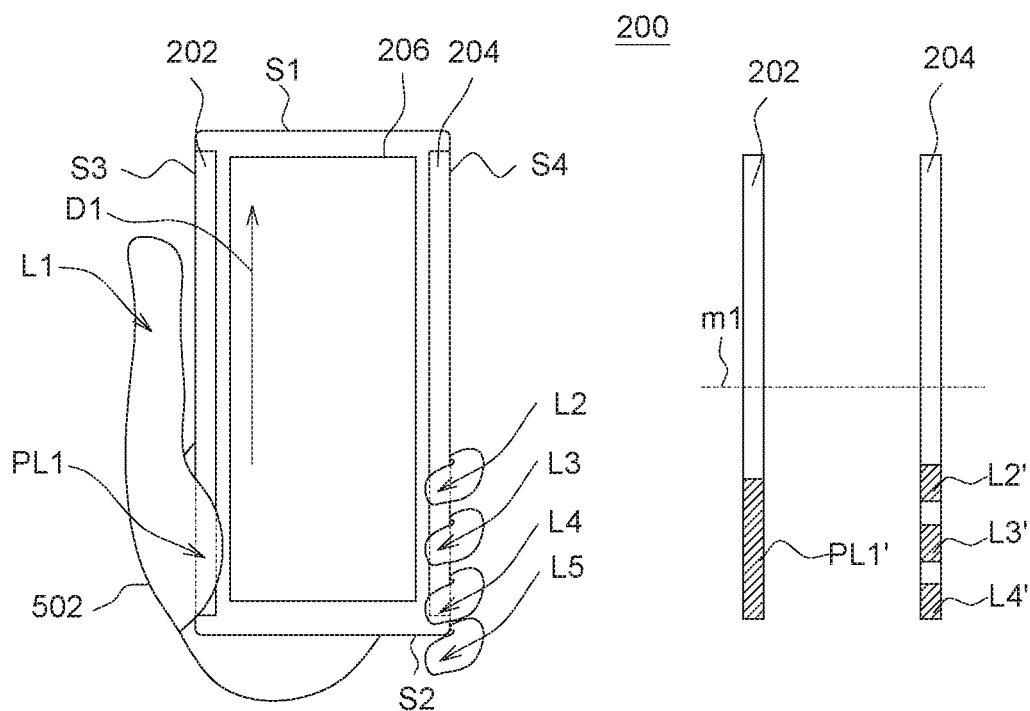
FIG. 13A shows a schematic diagram when the left hand holds the electronic apparatus 200 of FIG. 9.
FIG. 13B shows a schematic diagram of the finger position and palm position sensed by the first hold sensor and the second hold sensor of FIG. 13A.
Figures 14A, 14B:
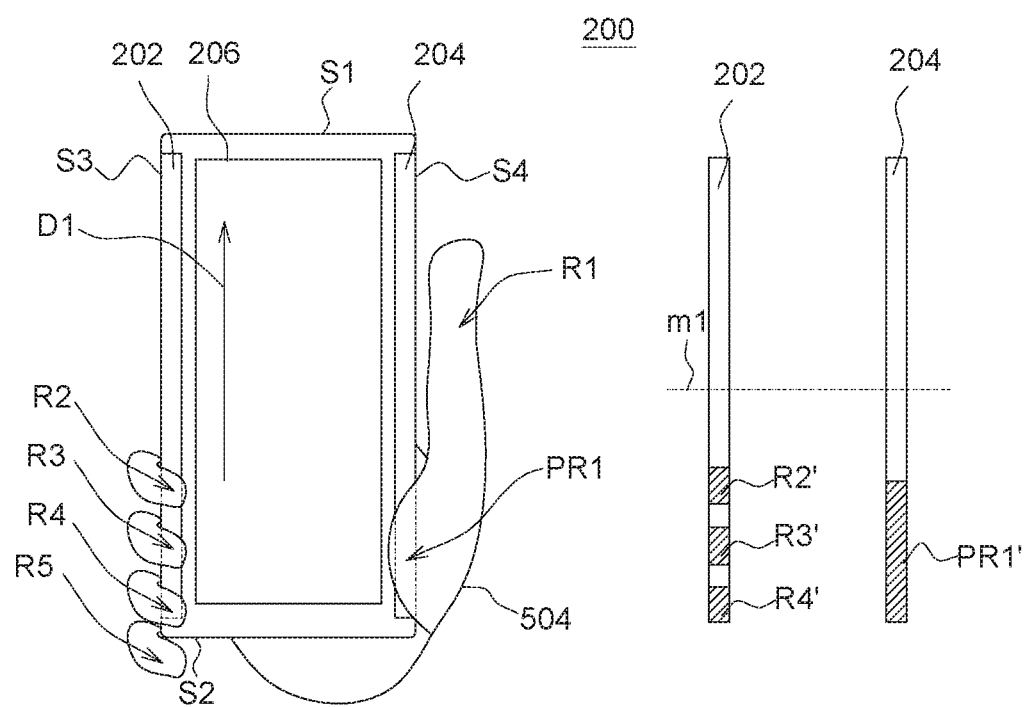
FIG. 14A shows a schematic diagram when the right hand holds the electronic apparatus of FIG. 9.
FIG. 14B shows a schematic diagram of the finger position and palm position sensed by the first hold sensor and the second hold sensor of FIG. 14A.

Referring to FIG. 13 and FIG. 14. FIG. 13A shows a schematic diagram when the left hand 502 holds the electronic apparatus 200 of FIG. 9. FIG. 13B shows a schematic diagram of the finger position and palm position sensed by the first hold sensor 202 and the second hold sensor 204 of FIG. 13A. FIG. 14A shows a schematic diagram when the right hand 504 holds the electronic apparatus 200 of FIG. 9. FIG. 14B shows a schematic diagram of the finger position and palm position sensed by the first hold sensor 202 and the second hold sensor 204 of FIG. 14A. In FIG. 13A, the palm PL1 of the left hand 502 touch the third side S3, and the index finger L2, the middle finger L3 and the ring finger L4 of the left hand 502 touch the fourth side S4. In FIG. 13B, the first hold sensor 202 senses a palm position PL1' and the second hold sensor 204 senses three finger positions L2', L3' and L4'. And the palm position PL1' and the three finger positions L2', L3' and L4' are close to the same side (i.e. the second side S2) of the electronic apparatus 200. In FIG. 14A, the palm PR1 of the right hand 504 touch the fourth side S4, and the index finger R2, the middle finger R3 and the ring finger R4 of the right hand 504 touch the third side S3. In FIG. 14B, the first hold sensor 202 senses three finger positions R2', R3' and R4' and the second hold sensor 204 senses a palm position PR1'. And the palm position PR1' and the three finger positions R2', R3' and R4' are close to the same side (i.e. the second side S2) of the electronic apparatus 200.

In another embodiment, in step S1202, if the finger position and the palm position sensed by the first hold sensor 202 and the second hold sensor 204 as shown in FIG. 13A and FIG. 14A, that is, the finger position and the palm position locate on the same sensing region. Then, in step S1204, the processor 208 determines the holding direction of the electronic apparatus 200 according to the sensing region which the center of gravity of the finger position and the center of gravity of the palm position locate on.

Specifically, the processor 208 divides the sensing regions of the first hold sensor 202 and the second hold sensor 204, and determines the sensing region which the center of gravity of the finger position and the center of gravity of the palm position locate on, and determines the holding direction of the electronic apparatus 200. For example, as shown in FIG. 13B and FIG. 14B, the sensing regions of the first hold sensor 202 and the second hold sensor 204 are divided into two equivalent regions according to middle line m1. That is, on the basis of line m1, the sensing region of the first hold sensor 202 is divided into a sensing region close to the first side S1 and a sensing region close to the second side S2, and the sensing region of the second hold sensor 204 is divided into a sensing region close to the first side S1 and a sensing region close to the second side S2.

Then, the processor 208 determines that the center of gravity of the finger position and the center of gravity of the palm position locate on which sensing region of the first hold sensor 202 and the second hold sensor 204. Take FIG. 13B for example, if the processor 208 determines that the center of gravity of the palm position PL1' locates on the sensing region close to the second side S2 and the center of gravity of the finger positions L2', L3' and L4' locates on the second side S2, the processor 208 determines that the holding direction of the electronic apparatus 200 is the first holding direction D1. Take FIG. 14B for example, if the processor 208 determines that the center of gravity of the palm position PR1 locates on the sensing region close to the second side S2 and the center of gravity of the finger positions R2', R3' and R4' locates on the second side S2, the processor 208 determines that the holding direction of the electronic apparatus 200 is the first holding direction D1. Conversely, if the processor 208 determines that the center of gravity of the palm position and the center of gravity of at least one finger position locate on the sensing region close to the first side S1, the processor 208 determines that the holding direction of the electronic apparatus 200 is the second holding direction D2. In this embodiment, we take three finger positions as an example, but not limited thereto. It is applicable that the first hold sensor 202 or the second hold sensor 204 senses at least one finger position, and the processor 208 determines that the center of gravity locates on which sensing region according to the center of gravity of the at least one finger position and the center of gravity of the palm position.

Thus, even when the palm position and the finger position are close to the same side, the processor 208 can still determine the holding direction of the electronic apparatus 200 according to the sensing region of the first hold sensor 202 and the second hold sensor 204 which the center of gravity of the finger position and the center of gravity of the palm position locate on. And the display orientation is determined based on the holding direction, to display the frame correctly.

Figure 15:
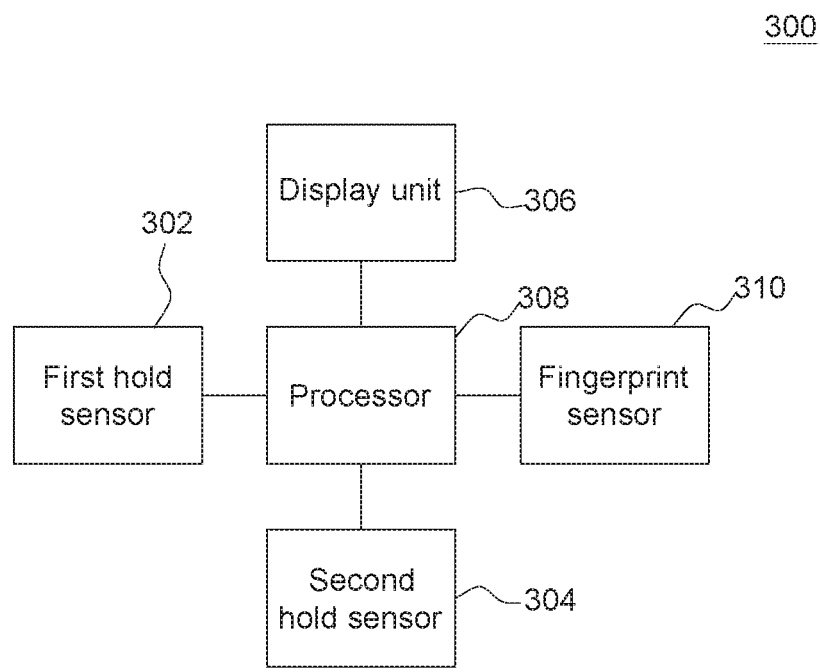
FIG. 15 shows a block diagram of the electronic apparatus having a function of determining display orientation according to an embodiment of the invention.
Figure 16:
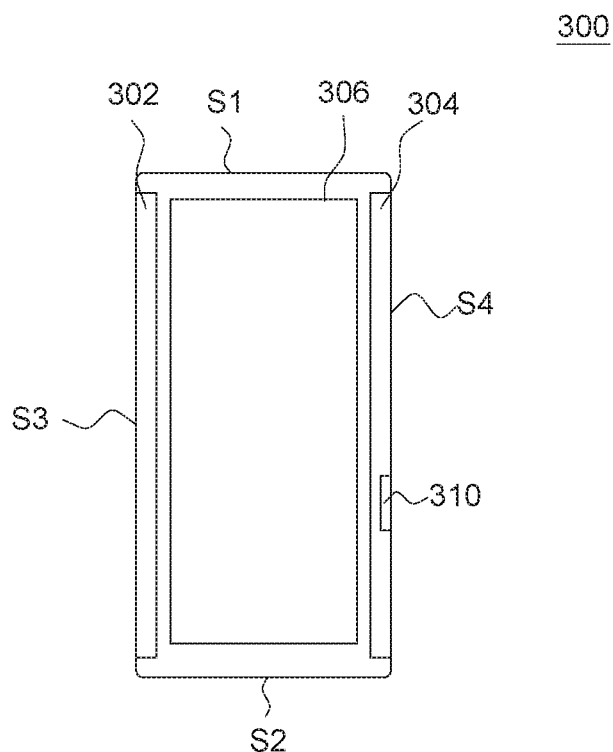
FIG. 16 shows a plan view of the electronic apparatus of FIG. 15.

Referring to FIG. 15 and FIG. 16. FIG. 15 shows a block diagram of the electronic apparatus 300 having a function of determining display orientation according to an embodiment of the invention. FIG. 16 shows a plan view of the electronic apparatus 300 of FIG. 15. The electronic apparatus 300 includes the first hold sensor 302, the second hold sensor 304, the display unit 306, the processor 308 and the fingerprint sensor 310. The first hold sensor 302, the second hold sensor 304, the display unit 306 and the fingerprint sensor 310 are coupled to the processor 308. The first hold sensor 302 and the second hold sensor 304 are disposed on the long sides of the electronic apparatus 300 respectively. The holding gesture includes finger position or palm position on the first hold sensor 302 and the second hold sensor 304. The fingerprint sensor 310 is disposed on one of the long sides of the electronic apparatus 300, for identifying the fingerprint of the finger. For example, as shown in FIG. 16, the fingerprint sensor 310 is disposed on the fourth side S4. In another embodiment, the electronic apparatus 300 can include two fingerprint sensors which are disposed on the two long sides of the electronic apparatus 300 respectively. The position and the number of the fingerprint sensor 310 are not limited in the invention.

Figure 17:
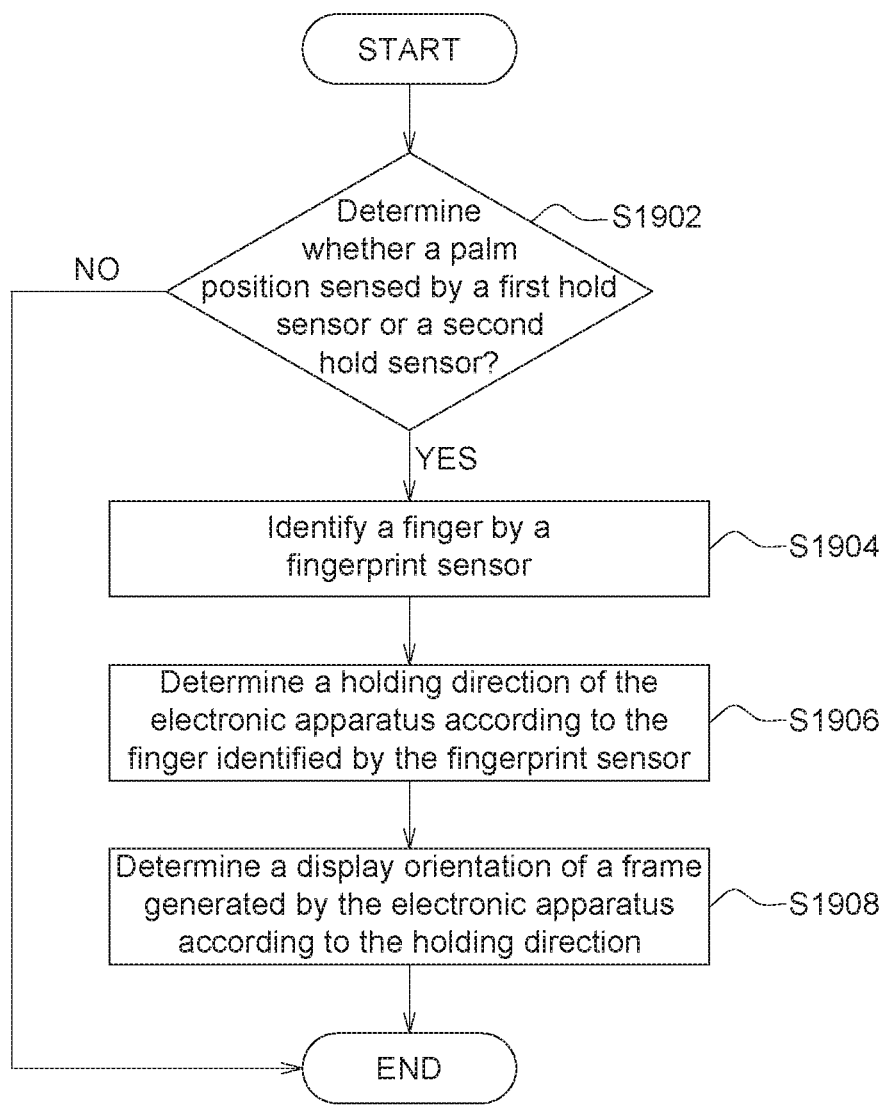
FIG. 17 shows a flow chart of a method for determining display orientation according to an embodiment of the invention.

Referring to FIG. 17, FIG. 17 shows a flow chart of a method for determining display orientation according to an embodiment of the invention. In this embodiment, the processor 308 determines whether the palm position is sensed. And, the fingerprint sensor 310 senses the fingerprint to identify the finger. Then, the processor 308 determines the holding direction of the electronic apparatus 300, and determines the display orientation of a frame generated by the electronic apparatus 300 according to the holding direction.

Figures 18A, 18B:
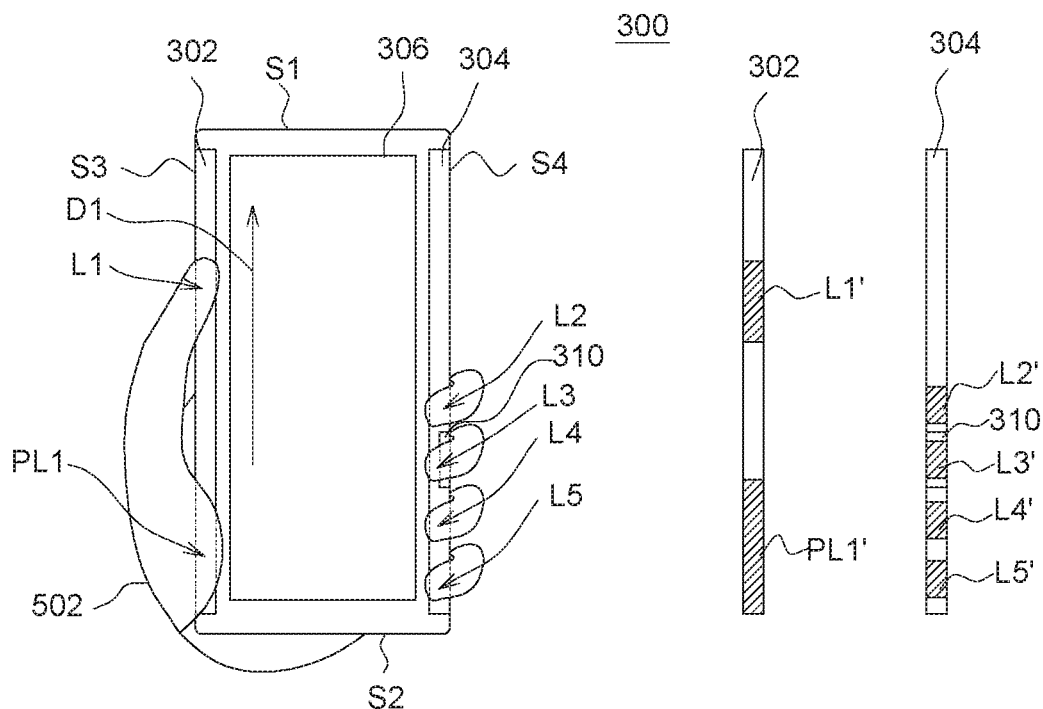
FIG. 18A shows a schematic diagram when the left hand holds the electronic apparatus of FIG. 16.
FIG. 18B shows a schematic diagram of the finger position and palm position sensed by the first hold sensor and the second hold sensor of FIG. 18A.

In step S1902, the processor 308 determines whether the palm position sensed by the first hold sensor 302 or the second hold sensor 304. When the sheeted touch point is sensed by the first hold sensor 302 or the second hold sensor 304, the processor 308 determines the palm position is sensed, and the method proceeds to step S1904. When the palm position is not sensed, the method proceeds to end step. Referring to FIG. 18A and FIG. 18B, FIG. 18A shows a schematic diagram when the left hand 502 holds the electronic apparatus 300 of FIG. 16. FIG. 18B shows a schematic diagram of the finger position and palm position sensed by the first hold sensor 302 and the second hold sensor 304 of FIG. 18A. In FIG. 18A, the palm PL1 and the thumb L1 of the left hand 502 touch the third side S3, and the index finger L2, the middle finger L3, the ring finger L4, and little finger L5 of the left hand 502 touch the fourth side S4. In FIG. 18B, the first hold sensor 302 senses a palm position PL1'.

In step S1904, the fingerprint sensor 310 identifies a finger. Specifically, the electronic apparatus 300 stores the fingerprints of every finger of the user in advance, and the fingerprints are used for identifying. Referring to FIG. 18B, the fingerprint sensor 310 senses the fingerprint of the finger position L3', and identifies the middle finger L3 of the left hand 502 according to the fingerprints stored in advance.

In step S1906, the processor 308 determines the holding direction of the electronic apparatus 300 according to the finger identified by the fingerprint sensor 310. In one embodiment, the fingerprint sensor 310 is disposed on the fourth side S4 of the electronic apparatus 300. If the fingerprint sensor 310 identifies one of the index finger L2, middle finger L3, ring finger L4 and little finger L5 of the left hand 502, the processor 308 determines that the holding direction of the electronic apparatus 300 is the first holding direction D1. If the fingerprint sensor 310 identifies one of the index finger R2, middle finger R3, ring finger R4 and little finger R5 of the right hand 504, the processor 308 determines that the holding direction of the electronic apparatus 300 is the second holding direction D2. In one embodiment, the fingerprint sensor 310 is disposed on the third side S3 of the electronic apparatus 300 (not shown). If the fingerprint sensor 310 identifies the thumb L1 of the left hand 502, the processor 308 determines that the holding direction of the electronic apparatus 300 is the first holding direction D1. If the fingerprint sensor 310 identifies the thumb R1 of the right hand 504, the processor 308 determines that the holding direction of the electronic apparatus 300 is the second holding direction D2.

In step S1908, the processor 308 determines the display orientation of the frame generated by the electronic apparatus 300 according to the holding direction.

Thus, when the first hold sensor 302 or the second hold sensor 304 senses the palm position, the holding direction of the electronic apparatus 300 is determined by the finger identified by the fingerprint sensor 310. And the display orientation is determined based on the holding direction, to display the frame correctly.

Figure 19:
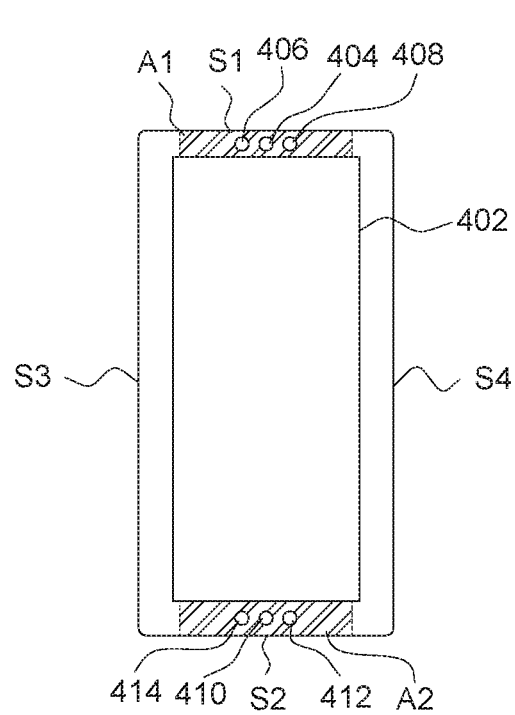
FIG. 19 shows a plan view of the electronic apparatus according to another embodiment of the invention.

Referring to FIG. 19, FIG. 19 shows a plan view of the electronic apparatus 400 according to another embodiment of the invention. The electronic apparatus 400 include a display unit 402, a first voice input unit 404, a first voice output unit 406, a first proximity sensor 408, a second voice input unit 410, a second voice output unit 412, and a second proximity sensor 414. The first voice input unit 404 and the second voice input unit 410 are, for example a microphone. The first voice output unit 406 and the second voice output unit 412 are, for example a microphone. The first voice input unit 404, the first voice output unit 406, and the first proximity sensor 408 are disposed on a first area A1 of the electronic apparatus 400, and the second voice input unit 410, the second voice output unit 412, and the second proximity sensor 414 are disposed on a second area A2 of the electronic apparatus 400, and the first area and the second area are located on the opposite sides of the electronic apparatus 400. For example, the first area A1 is close to the first side S1 and the second area A2 is close to the second side S2. In one embodiment, the processor 308 enables the first voice input unit 404, the first voice output unit 406, the first proximity sensor 408 and the second voice input unit 410, the second voice output unit 412 and the second proximity sensor 414, according to the hold direction. More specifically, when the processor 308 determines that the holding direction of the electronic apparatus 400 is the first holding direction D1, the processor 308 enables the first voice output unit 406 and the first proximity sensor 408 in the first area A1, and the second voice input unit 410 in the second area A2. Conversely, when the processor 308 determines that the holding direction of the electronic apparatus 400 is the second holding direction D2, the processor 308 enables the voice output unit 412 and the second proximity sensor 414 in the second area A2, and the first voice input unit 404 in the first area A1.

Figure 20:
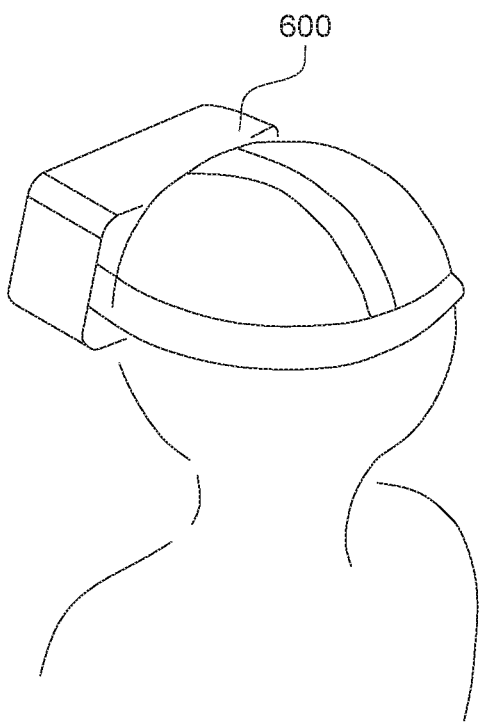
FIG. 20 shows a schematic diagram of the virtual reality device.

The electronic apparatus described in the aforementioned embodiments, for example, the electronic apparatus 100, 200 and 300, may be a virtual reality (VR) device, and the aforementioned frame may be a frame output by the virtual reality device. Referring to FIG. 20, FIG. 20 shows a schematic diagram the virtual reality device 600. The user holds a handheld object, the handheld object, for example, a wood shaped like a cell phone (not shown). The processor and the hold sensor described in the aforementioned embodiments can be disposed in the wood, and the processor can perform the method for determining the display orientation described in the aforementioned embodiments. After the processor determines the holding direction of the wood, the processor determines the display image corresponding to the position of the wood in the frame of the virtual reality device 600. For example, the processor displays a cell phone image corresponding to the position of the wood in the frame of the virtual reality device 600. Therefore, the user can see a cell phone rather than a wood in the frame of the virtual reality device 600.

In another embodiment, the processor keeps the auto orientation function (or does not perform the method for determining the display orientation described in the aforementioned embodiments) of the electronic apparatus enabled according to the type of the application currently executing on the electronic apparatus. For example, after a specific application (for example, a photo application) is executed, the method for determining the display orientation described in the aforementioned embodiments is not performed. Thus, when the user uses a specific application, the display orientation is prevented from changing so the user is not affected.

Base on the above, the holding gesture of the electronic apparatus is sensed by the hold sensor, and the holding direction of the electronic apparatus is determined according to the holding gesture, then a display orientation of a frame is determined according to the holding direction. Even when the screen of the electronic apparatus is parallel to the ground, the holding direction is determined correctly according to the hold sensor, therefore the frame can be displayed in a correct display orientation. It can be more effective to improve occurrence of the wrong display orientation, so that the user can watch the frame with the correct display orientation.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for determining a display orientation of a frame generated by an electronic apparatus, comprising:
   enabling an auto orientation function of the electronic apparatus;
   sensing a plurality of touch points a plurality of hold sensors, wherein the plurality of hold sensors comprise a first hold sensor disposed on a first side of the electronic apparatus and a second hold sensor disposed on a second side of the electronic apparatus, and the first side is opposite to the second side;
   determining whether the electronic apparatus is held in a portrait mode or a landscape mode according to a sensing result of the plurality of hold sensors, wherein the electronic apparatus is determined to be held in the landscape mode in response to the first hold sensor sensing two dotted touch points on the first side and the second hold sensor sensing another two dotted touch points on the second side; and
   determining whether to keep or deactivate the auto orientation function of the electronic apparatus according to the electronic apparatus being held in the portrait mode or the landscape mode.

2. The method according to claim 1, wherein the step of determining whether to keep or deactivate the auto orientation function of the electronic apparatus according to the electronic apparatus being held in the portrait mode or the landscape mode comprises:
   keeping the auto orientation function of the electronic apparatus enabled in response to a determination that the electronic apparatus is not held in the portrait mode.

3. The method according to claim 2, wherein the step of determining whether to keep or deactivate the auto orientation function of the electronic apparatus according to the electronic apparatus being held in the portrait mode or the landscape mode further comprises:
   keeping the auto orientation function of the electronic apparatus in response to a determination that the electronic apparatus is held in the landscape mode.

4. The method according to claim 1, wherein the step of determining whether to keep or deactivate the auto orientation function of the electronic apparatus according to the electronic apparatus being held in the portrait mode or the landscape mode comprises:
   deactivating the auto orientation function of the electronic apparatus in response to a determination that the electronic apparatus is held in the portrait mode.

5. The method according to claim 1, wherein the electronic apparatus is determined to be held in the portrait mode in response to the first hold sensor sensing a sheeted touch point and a dotted touch point on the first side.

6. The method according to claim 1,
   wherein the electronic apparatus is determined to be held in the portrait mode in response to the first hold sensor sensing at least one dotted touch point on the first side and the second hold sensor sensing a sheeted touch point on the second side.

7. The method according to claim 1, wherein the electronic apparatus comprises an inertial sensor, wherein the auto orientation function is for adjusting a display orientation of a frame generated by the electronic apparatus according to a sensing signal of the inertial sensor.

8. A non-transitory computer readable recording medium for storing one or more programs, the one or more programs causing a processor to perform the method according to claim 1 after the one or more programs are loaded on a computer and are executed.

9. An electronic apparatus having a function of determining a display orientation, comprising:
   a plurality of hold sensors, for sensing a plurality of touch points, wherein the plurality of hold sensors comprise a first hold sensor disposed on a first side of the electronic apparatus and a second hold sensor disposed on a second side of the electronic apparatus, and the first side is opposite to the second side; and
   a processor, coupled to the plurality of hold sensors and configured for:
      enabling an auto orientation function of the electronic apparatus;
      sensing a plurality of touch points by the plurality of hold sensors;
      determining whether the electronic apparatus is held in a portrait mode or a landscape mode according to a sensing result of the plurality of hold sensors, wherein the processor determines that the electronic apparatus is determined to be held in the landscape mode in response to the first hold sensor sensing two dotted touch points on the first side and the second hold sensor sensing another two dotted touch points on the second side; and
      determining whether to keep or deactivate the auto orientation function of the electronic apparatus according to the electronic apparatus being held in the portrait mode or the landscape mode.

10. The electronic apparatus according to claim 9, wherein the processor keeps the auto orientation function of the electronic apparatus enabled in response to a determination that the electronic apparatus is not held in the portrait mode.

11. The electronic apparatus according to claim 10, wherein the processor deactivates the auto orientation function of the electronic apparatus in response to a determination that the electronic apparatus is held in the portrait mode.

12. The electronic apparatus according to claim 11, wherein the processor keeps the auto orientation function of the electronic apparatus in response to a determination that the electronic apparatus is held in the landscape mode.

13. The electronic apparatus according to claim 9, wherein the processor determines that the electronic apparatus is held in the portrait mode in response to the first hold sensor sensing a sheeted touch point and a dotted touch point on the first side.

14. The electronic apparatus according to claim 9,
wherein the processor determines that the electronic apparatus is held in the portrait mode in response to the first hold sensor sensing at least one dotted touch point on the first side and the second hold sensor sensing a sheeted touch point on the second side.

15. The electronic apparatus according to claim 9, wherein the electronic apparatus comprises an inertial sensor, the auto orientation function is for adjusting a display orientation of a frame generated by the electronic apparatus according to a sensing signal of the inertial sensor of the electronic apparatus.

* * * * *